(12) United States Patent
Tyner

(10) Patent No.: US 8,015,929 B2
(45) Date of Patent: Sep. 13, 2011

(54) TRAY APPARATUS

(76) Inventor: Jeffrey D. Tyner, Grand Rapids, MI (US)

(*) Notice: Subject to any disclaimer, the term of this patent is extended or adjusted under 35 U.S.C. 154(b) by 603 days.

(21) Appl. No.: 11/657,818

(22) Filed: Jan. 25, 2007

(65) Prior Publication Data
US 2008/0178777 A1 Jul. 31, 2008

(51) Int. Cl.
*A47B 3/00* (2006.01)
(52) U.S. Cl. ............ 108/134; 108/42; 108/152
(58) Field of Classification Search .......... 108/152, 108/6, 9, 42, 157.13, 134–135, 149; 248/218.4, 248/240
See application file for complete search history.

(56) References Cited

U.S. PATENT DOCUMENTS

| | | | | |
|---|---|---|---|---|
| 1,789,815 A | * | 1/1931 | Hanley | 248/231.71 |
| 2,774,640 A | * | 12/1956 | Harmon et al. | 297/163 |
| 3,902,931 A | * | 9/1975 | Danciger et al. | 248/227.3 |
| 4,691,804 A | * | 9/1987 | Bunker | 182/187 |

* cited by examiner

*Primary Examiner* — Hanh V Tran
(74) *Attorney, Agent, or Firm* — The Watson I.P. Group, PLC; Jovan N. Jovanovic; Vladan M. Vasiljevic (57) ABSTRACT

A tray apparatus has a tray base assembly, a tray member and a tray articulating member. The tray base assembly includes a stop member positioned on a front surface thereof and a tray articulation coupling member. The tray member has a top surface and a bottom surface and a first and second side edge. The tray articulating member has a bracket rotatably coupled to the tray articulation coupling member of the tray base assembly, a first side region rotatably coupled to the first side edge and a second side region rotatably coupled to the second side edge. The tray member is movable between a collapsed configuration wherein the top surface of the tray member substantially abuts the front surface of the tray base assembly, and an articulated configuration wherein the top surface of the tray member substantially abuts the stop member of the tray base assembly.

10 Claims, 6 Drawing Sheets

TRAY APPARATUS

BACKGROUND OF THE INVENTION

1. Field of the Invention

The invention relates in general to a trays, and more particularly, to a tray apparatus configured to be coupled to an outside post member and which can be articulated from a collapsed configuration to an articulated configuration.

2. Background Art

The use of tray apparatuses is well known in the art. For example, in a hospital setting, there is a constant need for a tray for the handy placement of medical implements, food, medicines, among other things. Typically, a hospital room includes a number of fixed tables. Such tables, however, are typically placed in a spaced apart orientation from the hospital bed. Accordingly, it is often the case that all tables in a hospital room are spaced away from where they are needed.

As such, certain tables have been designed which can be moved about within a room, such as a hospital room. Such tables are typically used for feeding of a patient, and include portions which extend below a hospital bed just as the table extends over the hospital bed. While such tables are more versatile, these tables are generally quite large and cumbersome. Where space is at a premium, such tables are often of limited utility.

It would be advantageous if a tray could be provided which can be coupled to outside objects, such as hospital beds, intravenous bag stands, and other outside post members. Further, it would be advantageous if such a tray could be collapsed and stowed when not needed, and, articulated only when required for use.

It is an object of the present invention to provide a tray which can be coupled to an outside post member.

It is another object of the present invention to provide a tray which can be articulated or collapsed as needed.

It is another object of the invention to provide a tray member which utilizes only a minimal amount of space and can be articulated when needed for use.

These objects, as well as other objects of the present invention, will become apparent in light of the present specification, claims, and drawings.

SUMMARY OF THE INVENTION

The invention is directed to a tray apparatus which in a first aspect of the invention comprises a post attachment assembly, a tray base assembly, a tray member and a tray articulating member. The post attachment assembly is structurally configured to releasably couple to an outside post member. The tray base assembly is attached to the post attachment assembly. The tray base assembly includes a stop member positioned on a front surface thereof and a tray articulation coupling member. The tray member has a top surface and a bottom surface as well as a first side edge and a second side edge. The tray articulating member has a bracket rotatably coupled to the tray articulation coupling member of the tray base assembly, a first side region rotatably coupled to the first side edge and a second side region rotatably coupled to the second side edge. The tray member is movable between a collapsed configuration wherein the top surface of the tray member substantially abuts the front surface of the tray base assembly, and an articulated configuration wherein the top surface of the tray member substantially abuts the stop member of the tray base assembly, to, in turn, facilitate the use of the top surface thereof.

In a preferred embodiment of the tray apparatus, a clamp housing and an adjustment member are provided. The clamp housing further comprises a front wall, and opposing side walls, cooperatively defining a clamp slot. One of the opposing side walls include an opening extending therethrough having a threadform. The adjustment member comprises a screw member having a threadform matingly engageable with the threadform of the opening.

In another preferred embodiment, the opposing side wall which does not include an opening includes a first oblique panel and a second oblique panel. The panels are oblique to each other, to the front wall and to the opposing side wall having the opening therethrough.

In another preferred embodiment, the tray base assembly further comprises an elongated member extending below the stop member. The elongated member includes a tray bearing region upon which an inner edge of the tray member is slidably guidable between a collapsed and an articulated configuration.

In another preferred embodiment, the tray articulation coupling member comprises a longitudinal slot having a dampening sleeve positioned therein between the bracket and the longitudinal slot. The dampening sleeve is biased against the longitudinal slot and the bracket.

In another preferred embodiment, the tray member includes an inner edge having a base contact surface and a pair of opposing segments extending from opposing sides of the base contact surface and terminating at opposing side edges. The pair of opposing segments are oblique to each of the base contact surface and the opposing side edges. The bracket member substantially corresponding to the pair of opposing segments when the tray member is in an articulated configuration.

In a preferred embodiment, the tray member comprises a convex outer edge extending between the side edges.

In another preferred embodiment, the tray member is substantially symmetrical about a longitudinal axis perpendicular to and extending about a midpoint of the base contact surface.

In yet another preferred embodiment, the top surface of the tray member further includes a channel embedded therein. In one such embodiment, the top surface includes an outer embedded channel which follows a portion of an outer edge and the side edges thereof, and, an inner embedded channel which follows a portion of an inner edge thereof.

In a preferred embodiment, the tray apparatus further includes a clamp housing configured for receipt of a substantially horizontal outside post member. The clamp housing further comprises a front wall, a back wall and a top transition region extending therebetween, which defines a clamp slot.

In a preferred embodiment, the stop member comprises a recessed slot positioned in the front surface of the tray base assembly.

Preferably, the stop member has a width which substantially matches the width of the tray member.

In another preferred embodiment, the tray apparatus includes a pair of opposing side walls, and a pair of corresponding openings positioned on the opposing side walls. The bracket comprises a first bracket member coupled to the opening positioned on one of the side walls and the first side edge of the tray member, and a second bracket member coupled to the opening positioned on the other of the side walls and the second side edge of the tray member.

In another aspect of the invention, the invention comprises a tray apparatus having a post attachment assembly, a tray base assembly, a tray member and a tray articulating member. The post attachment assembly has a clamp member structurally configured to releasably couple to a substantially horizontal outside post member. The tray base assembly is attached to the post attachment assembly and includes a stop member recessed in a front surface thereof along with a first side wall and a second side wall opposing the first side wall. The tray member has a top surface and a bottom surface, a first side edge and a second side edge opposing the first side edge. The tray articulating member comprises a first bracket component and a second bracket component. The first bracket component is rotatably coupled to the opening of the first side wall of the tray base assembly and rotatably coupled to the first side wall of the tray member. The second bracket component is rotatably coupled to the opening of the second side wall of the tray base assembly and rotatably coupled to the second side wall of the tray member. The tray member is movable between a collapsed configuration wherein the top surface of the tray member substantially abuts the front surface of the tray base assembly, and an articulated configuration wherein the top surface of the tray member is positioned within the stop member of the tray base assembly, to, in turn, facilitate the use of the top surface thereof.

In a preferred embodiment, the tray base assembly has a width and the tray member has a width which is substantially identical to the width of the tray base assembly.

In another preferred embodiment, the tray member is sized so that the tray member substantially snaps into the stop member upon the positioning of the tray member into an articulated configuration.

In yet another preferred embodiment, the clamp member comprises a front wall, a back wall and a top transition region coupling the front and back walls, cooperatively defining a clamp slot.

In another preferred embodiment, the post attachment assembly and the tray base assembly comprise an integrated molded member.

In yet another preferred embodiment, the back wall further includes an indent configured to preclude the inadvertent dislodgement of a substantially horizontal outside post member positioned within the clamp slot.

BRIEF DESCRIPTION OF THE DRAWINGS

The invention will now be described with reference to the drawings wherein.

DETAILED DESCRIPTION OF THE INVENTION

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
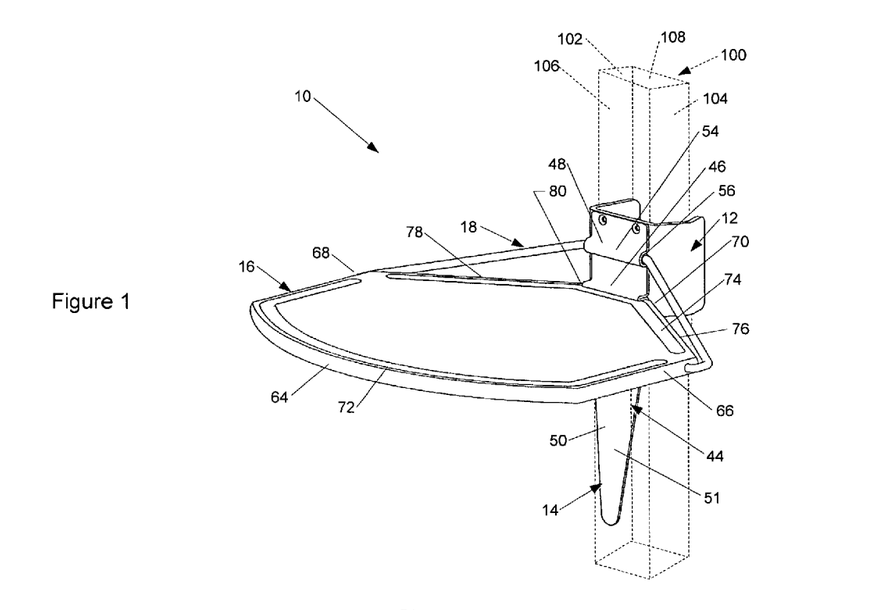
FIG. 1 of the drawings comprises a perspective view of an embodiment of the tray apparatus of the present invention.

Referring now to the drawings and in particular to FIG. 1, the tray apparatus is shown generally at 10. The tray apparatus is configured for coupling to an outside post member, such as post member 100. Such a post member is found, for example in hospital rooms, attached to hospital beds or as separate members from which, for example, iv's or other members are hung. Of course, the invention is not limited to use in a hospital or medical setting, and any reference to such use is to be considered exemplary.

More specifically, the tray apparatus is shown in FIG. 1 as comprising post attachment assembly 12, tray base assembly 14, tray member 16 and tray articulating member 18. The post attachment assembly 12 is configured for attachment to post member 100, wherein the post member includes an outer surface with which to engage. For example, the post member may comprise a square or rectangular cross-sectional configuration with opposing side surfaces 102, 104, front surface 106 and back surface 108. In other uses, the post member may comprise a circular cross-section or a heretofore not mentioned polygonal configuration.

Figure 2:
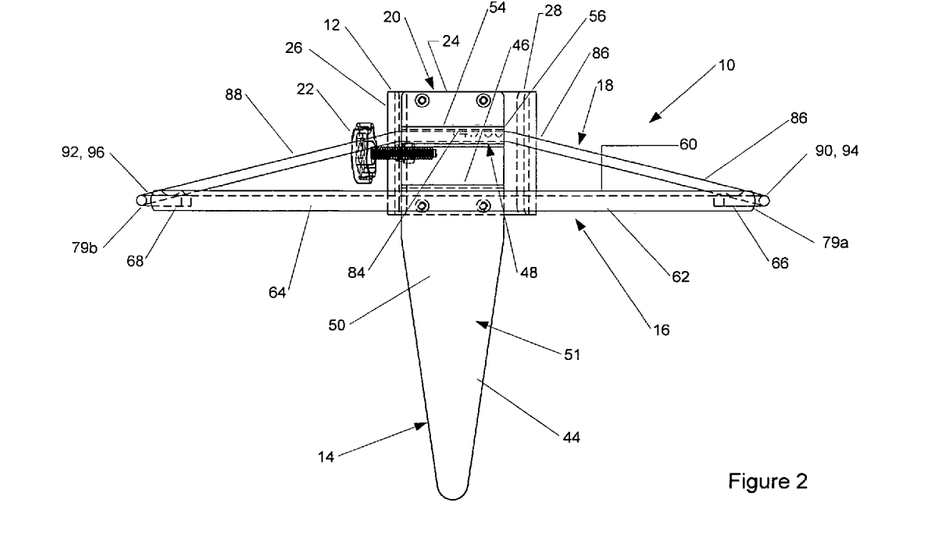
FIG. 2 of the drawings comprises a front plan view of an embodiment of the tray apparatus of the present invention, showing, in particular, the tray member in an articulated configuration.
Figure 3:
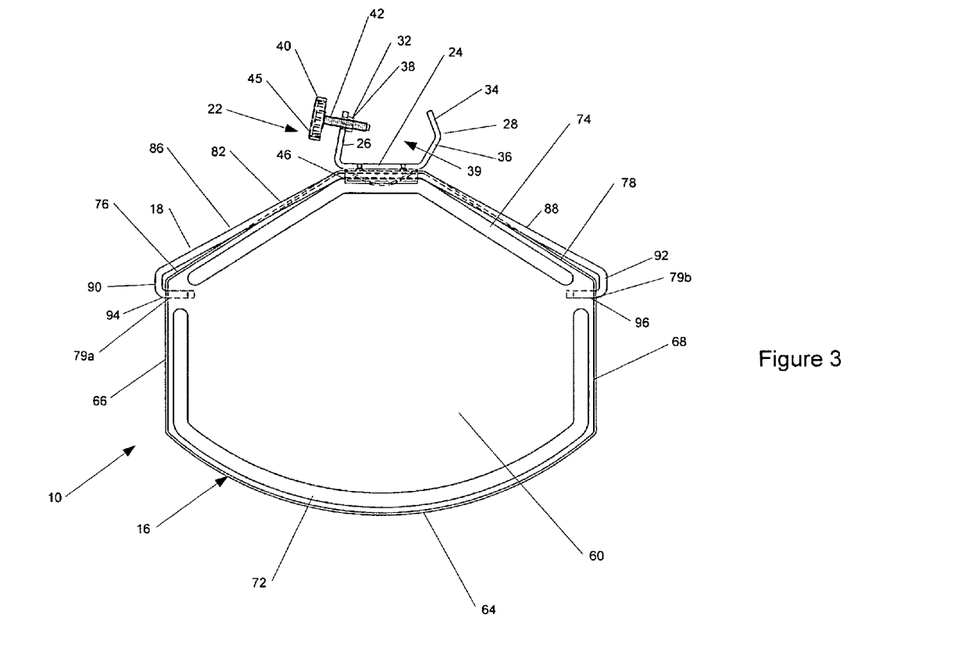
FIG. 3 of the drawings comprises a top plan view of an embodiment of the tray apparatus of the present invention, showing, in particular, the tray apparatus in an articulated configuration.

With reference to FIGS. 2 and 3, collectively, the post attachment assembly includes clamp housing 20 and adjustment member 22. The clamp housing 20 includes front wall 24, first side wall 26 and second side wall 28. The front wall 24 is substantially planar in configuration. The first side wall is substantially planar and includes opening 32. The opening 32 includes threads 38 disposed thereon. The second side wall 28 includes a pair of oblique panels, namely oblique first panel 34 and oblique second panel 36. The oblique panels are disposed so as to improve the coupling of the clamp housing to various differently configured outside post members 100 (FIG. 1).

The first side wall and the second side wall emanate from opposing sides of the front wall so as to define clamp slot 39 within which the outside post member is positioned. In the embodiment shown, the first side wall is oblique to the front wall 24 and the two oblique panels of the second side wall are oblique to the front wall. The two oblique panels are configured such they can cooperate to retain a substantially circular or elliptical outside post member.

While the dimensions may be varied, the length of the front and side walls is approximately between 3 and 5 inches, the width of the front panel is approximately between 2 and 4 inches. Of course, these dimensions may be varied so as to accommodate differently sized and shaped outside post members. The clamp housing is formed from a stamped metal member, while other materials and formation processes are contemplated. For example, the clamp housing may comprise a composite member, a molded polymer member, or other natural or synthetic materials.

As is shown in FIG. 3, adjustment member 22 comprises screw 40 which is threaded through opening 32. The screw includes mating threads 42 and adjustment head 45. The adjustment head 45 is utilized to advance or retard the adjustment member. In certain embodiments, the adjustment head may be configured so as to be advanced or retarded by a user's hand, whereas in other embodiments, special or conventional tools may be required to adjust the adjustment member.

Figure 4:
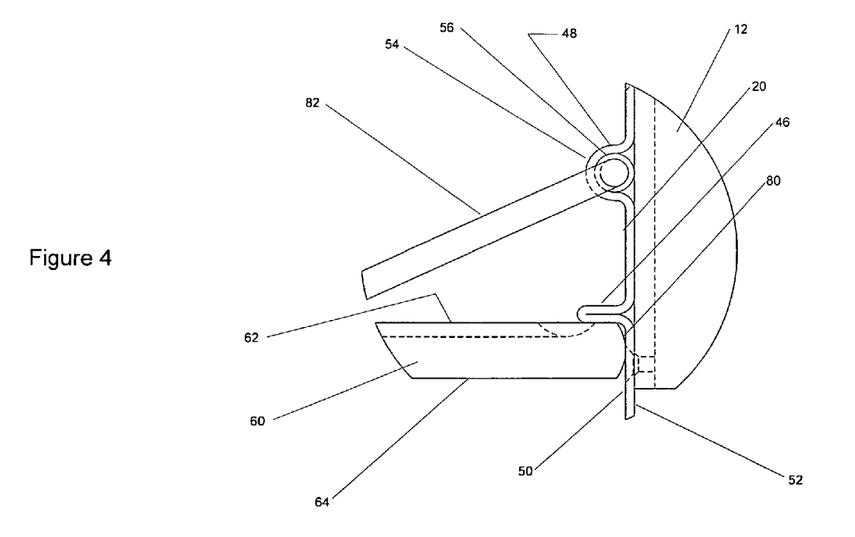
FIG. 4 of the drawings comprises a partial side elevational view of the post attachment member and the tray base assembly of an embodiment of the tray apparatus of the present invention.

The tray base assembly 14 is shown in FIGS. 1, 2 and 4, collectively, as comprising elongated member 44, stop member 46 and tray articulation coupling member 48. The elongated member 44 includes front surface 50 and back surface 52. The elongated member is coupled to the front wall 24 of the clamp housing 20 through any number of different attachment means. For example, the two members may be welded, adhered or fastened together either permanently or releasably, as desired. In certain embodiments, the post attachment assembly may be removed, and the tray base assembly 14 can be attached directly to an outside surface, such as a wall, or the like.

With reference to FIG. 2, the front surface includes tray bearing region 51 which provides a surface upon which the base contact surface 80 of the tray member 16 (which will be described in detail below) may be slidably moved and guided when extending between a collapsed and an articulated configuration. In the embodiment shown, the elongated member gently tapers away from the stop member 46 so as to decrease the surface contact with the tray member. In the embodiment shown, the elongated member extends away from the outside post member such that it provides a biasing force against the tray member, so as to preclude inadvertent collapsing of same, and to further guide the tray member into an articulated configuration.

Stop member 46 extends outwardly from the front surface 50 just above the tray bearing region 51 so as to define the fully articulated position of the tray member. The stop member extends a distance from the front surface sufficient to preclude the tray member from inadvertently extending beyond the stop member. In another embodiment, the stop member may include a slot which is disposed on the front surface 50 of the elongated member 44.

The tray articulation coupling member 48 is shown in FIGS. 1 and 2 as comprising longitudinal slot 54 positioned above the stop member. In the embodiment shown, the longitudinal slot 54 extends across the front surface of the elongated member. The slot is substantially uniform and substantially parallel to the stop member (both of which are substantially perpendicular to the clamp slot defined by the walls of the clamp housing). A dampening sleeve 56 is positioned within the longitudinal slot. The dampening sleeve may comprise a rubber member, or another natural or synthetic polymer member.

The tray member 16 is shown in FIGS. 2 and 3, collectively, as comprising top surface 60, bottom surface 62, outer edge 64, first side edge 66, second side edge 68 and inner edge 70. The top surface and the bottom surface are substantially parallel to each other to define a substantially uniformly thick tray member. The top surface 60 includes embedded channels which substantially follow the outer perimeter of the tray member. Specifically, in the embodiment shown, an outer embedded channel 72 extends about a portion of the perimeter of the top surface and an inner embedded channel 74 extends about a portion of the perimeter of the top surface.

The outer edge includes a substantially uniform convex configuration. The first and second side edges are spaced apart from each other and substantially parallel to each other. The side edges are likewise, in the embodiment shown, perpendicular to the front surface of the elongated member of the tray base assembly 14. The side edges include corresponding openings 79a, 79b, respectively. These openings extend between the top surface and the bottom surface at corresponding positions on the respective side edges. As will be explained in detail below, the openings are configured to receive and retain the tray articulating member 18.

The inner edge 70 includes base contact surface 80 and opposing segments 76, 78. The opposing segments 76, 78 link the contact surface 80 with the respective side edges 66, 68, respectively. The opposing segments are oblique relative to each of the base contact surface 80 and the side edges 66, 68. The base contact surface is elongated such that it interfaces with substantially the width of the front surface 50 of the elongated member 44 so as to enhance the stability of the tray member and so as to limit any rotational movement of the tray member.

In the embodiment shown the tray member comprises a integrated polymer member which is molded and machined as desired. In other embodiments, the tray member may comprise a metal member which is cast or stamped into a desired configuration. In other embodiments, the tray member may comprise a wood member, a composite, or any combination of the foregoing. Furthermore, while the various edges are shown in the preferred embodiment, the edges may comprise any one of linear, concave, convex and arbitrary configurations. For example, the edges may be configured so that any edge is able to matingly couple to outside objects. The tray member is substantially symmetrical about a longitudinal axis extending perpendicular to the base contact surface about the mid-point thereof.

The tray articulating member 18 is shown in FIGS. 2 and 3 as comprising bracket 82 which includes central region 84, first side region 86, second side region 88 and hook region 90, 92. The central region 84 extends through longitudinal slot 54 of the tray articulation coupling member 48. The first and second side regions extend from opposing the central region 84 oblique to the central region terminating at the opposing hook regions 90, 92. The hook region 90 includes tray engagement end 94 which is insertable into opening 79*a* of the first side edge. The hook region 92 includes tray engagement end 96 which is insertable into opening 79*b* of the second side edge. In the embodiment shown, the bracket 82 comprises a substantially planar member which is substantially symmetrical about a longitudinal axis extending perpendicular to the central region about the mid-point thereof. The bracket member comprises a round metal member which is shaped into the desired configuration. In other embodiments, the bracket member may comprise multiple components operating independently, or multiple components which are coupled (releasably or otherwise) to each other.

Figure 5A:
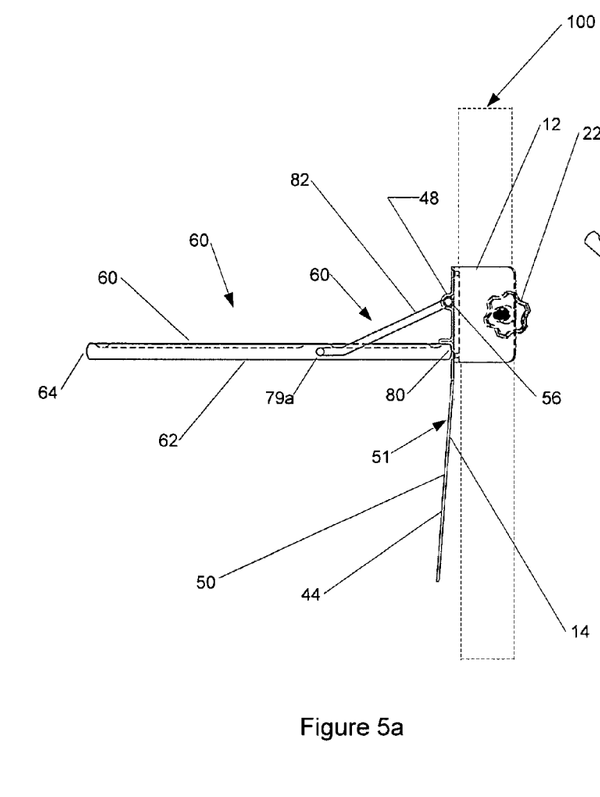
FIG. 5a of the drawings comprises a side elevational view of an embodiment of the tray apparatus of the present invention, showing, in particular, the tray member in an articulated configuration.
Figure 5B:
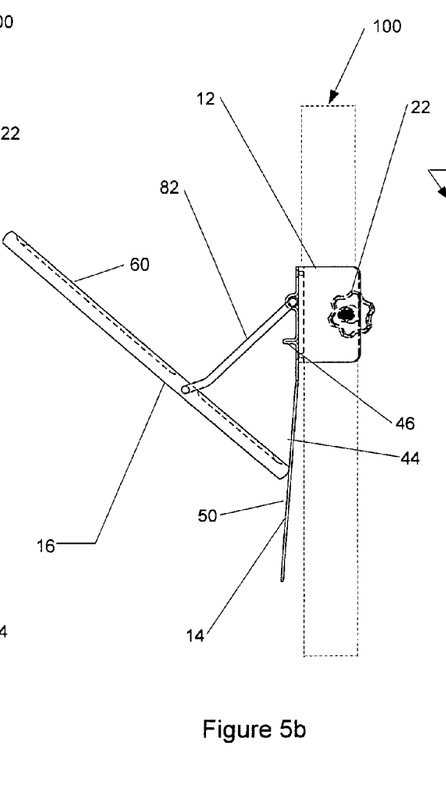
FIG. 5b of the drawings comprises a side elevational view of an embodiment of the tray apparatus of the present invention, showing, in particular, the tray member in a configuration between a collapsed configuration and an articulated configuration.
Figure 5C:
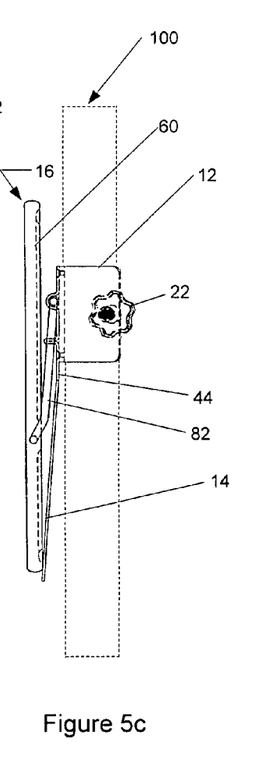
FIG. 5c of the drawings comprises a side elevational view of an embodiment of the tray apparatus of the present invention, showing, in particular, the tray member in a collapsed configuration.

In operation, and with reference to FIGS. 5*a*, 5*b* and 5*c*, the user first determines the outside post member, such as post 100, to which the tray apparatus 10 is to be attached. Once determined, the user determines the height at which the device is to be coupled. Once the height is determined, the user places the outside post member 100 within the clamp slot 39. Next, the user rotates the screw of the adjustment member 22 until the outside post member 100 is clamped between the second side wall and the screw.

Once the device is fully positioned, any user can utilize the tray member by positioning the tray member between a collapsed configuration (FIG. 5*c*) and an articulated configuration (FIG. 5*a*). In more detail, in a collapsed configuration, the tray table is positioned such that the top surface 60 of the tray member 16 is in an abutting relationship with the front surface 50 of elongated member 44 of the tray base assembly, resulting in the tray having a substantially vertical orientation. The dampening sleeve 56 can be configured so as to be biased against the bracket 82, to, in turn, provide resistance against the rotation of the bracket 82. Additionally, the relative weight of the tray outboard of the opening 79 and the tray inboard of the opening 79*a* can be adjusted so as to preclude the inadvertent articulation of the tray member.

To articulate the tray member, the user rotates and translates the outer edge 64 of the tray member relative to each of the tray base assembly 14 and the tray articulating member 18. The base contact surface 80 can be translated along the tray bearing region 51 of the elongated member 44 until the base contact surface 80 contacts the stop member 46 of the tray base assembly. The stop member in cooperation with the tray articulating member 18, precludes further movement of the tray member. In such an orientation, the tray member is substantially perpendicular to the outside post member and the slot of the clamp housing (and in turn, substantially horizontal and ready for use).

Advantageously, the base contact surface 80 is relatively wide and at least the width of the outside post member, whereby the extended contact between the front surface of the elongated member 44 and the base contact surface 80 precludes side to side movement of the articulated tray member 16. Furthermore, and with reference to FIGS. 1 and 3, in an articulated configuration, the side regions of the bracket correspond in special orientation as the opposing segments 76, 68 of the inner edge 70 of the tray member, such that they do not obstruct or otherwise interfere with any objects positioned on the tray member. Finally, the user is able to adjust the position of the tray apparatus relative to the outside post member regardless of the relative position (articulated or collapsed) of the tray member.

In another embodiment of the invention, shown in FIGS. 6 through 10*c*, the outside post member 300 (FIGS. 10*a* through 10*c*) may comprise a horizontal member, instead of a vertical member. In such an embodiment, tray apparatus 210 includes post attachment assembly 212 which comprises clamp housing 220 which is configured to releasably retain a substantially horizontal outside post member. As such, the clamp housing 220 includes a front wall 224, back wall 226 and top transition region 228 spanning between the front wall and the back wall. The front wall, the back wall and the top transition region define clamp slot 239. The back wall includes indent 231 which aids to maintain the outside post member within the defined clamp slot 239. Furthermore, the material from which the clamp housing 220 is formed is resilient such that it may exert a biasing force against the outside post member to further aid retention, wherein the outside post member is slightly larger than the defined clamp slot 239.

Figure 6:
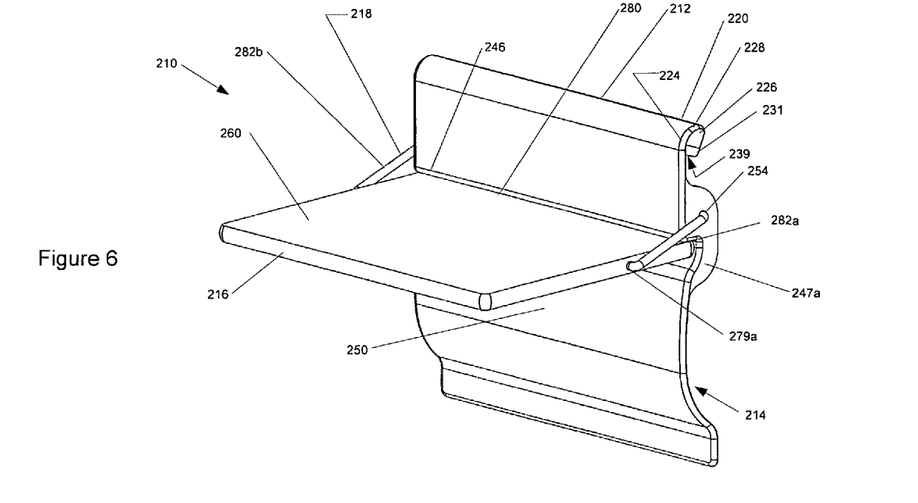
FIG. 6 of the drawings comprises a perspective view of an embodiment of the tray apparatus of the present invention, showing, in particular, the tray member in an articulated configuration.
Figure 7:
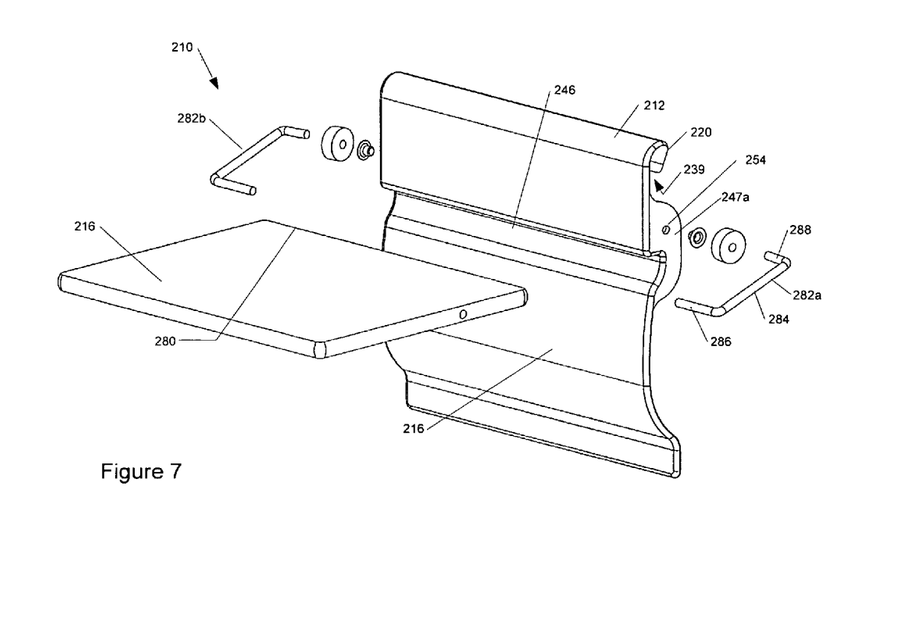
FIG. 7 of the drawings comprises an exploded perspective view of an embodiment of the tray apparatus of the present invention, showing, in particular, the tray member in an articulated configuration.

In the embodiment shown, the tray base assembly 214 is integrally formed with the post attachment assembly 212. Additionally, while not specifically required, in the embodiment shown, the tray base assembly and the post attachment assembly have a width which is substantially that of tray member 216. The tray base assembly 214 includes first side wall 247*a* and a second side wall 247*b*, which is a mirror image of the first side wall. Additionally, the lower end of the tray base assembly 214 is configured to engage the bottom of a bed, or another member, to, in turn, preclude rotation of the post attachment assembly 212 about the outside post member 300.

The tray base assembly includes a recessed stop member 246 into which the articulated tray member 216 is positioned. The tray member 216 can be slid into the stop member 246 due, in part, to the resilience of the material from which the tray base assembly 214 is formed. As such, the tray member slides along the front surface 250 and essentially "snaps" into the slot of the stop member. This rather tight fit enhances the retention of the tray member within the recessed stop member.

Figure 8:
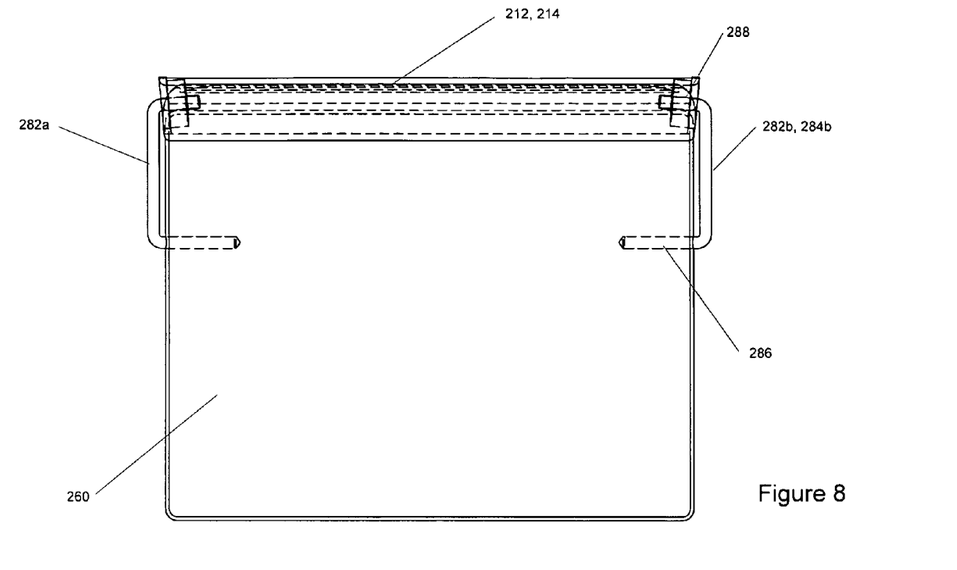
FIG. 8 of the drawings comprises a top plan view of an embodiment of the tray apparatus of the present invention, showing, in particular, the tray member in an articulated configuration.
Figure 9:
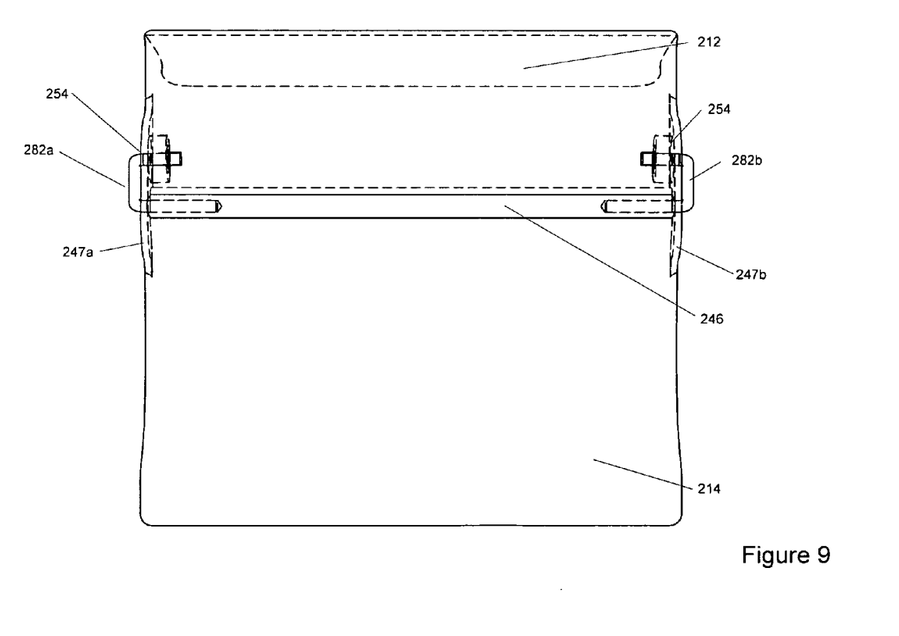
FIG. 9 of the drawings comprises a back plan view of an embodiment of the tray apparatus of the present invention, showing, in particular, the tray member in an articulated configuration.

The tray member 216 generally comprises a substantially rectangular member, although other shapes are likewise contemplated. The tray articulating member 218 comprises a first bracket 282*a* and a second bracket 282*b* which is a substantial mirror image thereof. As such, first bracket 282*a* will be described with the understanding that it is substantially identical to second bracket 282*b*. With reference to FIG. 8, bracket 282*a* comprises an elongated "C" shaped bracket having central region 284 with side regions 286, 288 flanking either side. The side regions are parallel to each other and perpendicular to the central region. The first side region 286 is inserted into opening 279*a* and the second side region 288 is inserted into opening 254 which is on side wall 247*a* of the tray base assembly 214 positioned above stop 246.

Figure 10A:
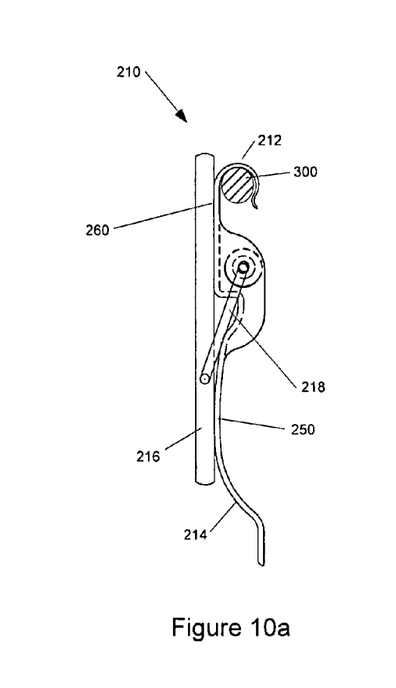
FIG. 10a of the drawings comprises a side elevational view of an embodiment of the tray apparatus of the present invention, showing, in particular, the tray member in a collapsed configuration.
Figures 10B, 10C:
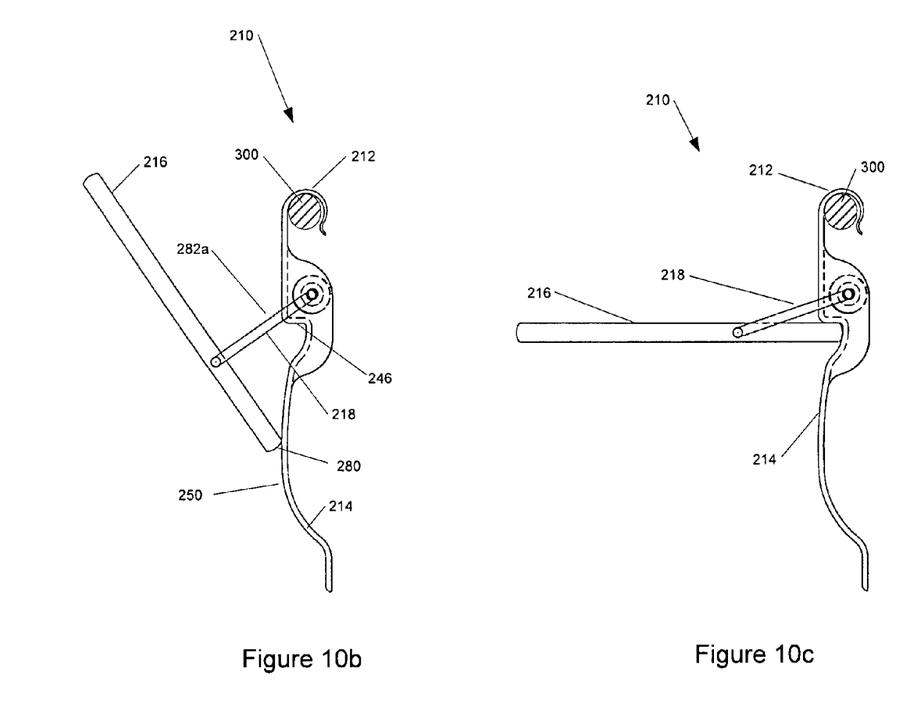
FIG. 10b of the drawings comprises a side elevational view of an embodiment of the tray apparatus of the present invention, showing, in particular, the tray member between an articulated configuration and a collapsed configuration.
FIG. 10c of the drawings comprises a side elevational view of an embodiment of the tray apparatus of the present invention, showing, in particular, the tray member in an articulated configuration.

In a collapsed configuration, and with reference to FIG. 10*a*, the top surface 260 of the tray member 216 abuts the front surface 250 of the tray base assembly 214, and, in certain embodiment, a portion of the post attachment assembly 212. With reference to FIGS. 10*b* and 10*c*, to articulate the tray member 216, the tray is rotated and translated by way of brackets, such as bracket 282*a*, such that base contact surface 280 of the tray member 216 slides along the front surface 250 of the tray base assembly 214 until the base contact surface 280 is positioned within the stop member 246. The stop member, in cooperation with the brackets 282*a*, 282*b* (FIG. 6) maintain the tray member 216 in a substantially horizontal and articulated configuration. The tray is ready for use.

To collapse the tray, the tray is pulled out of the stop member 246 and the base contact surface 280 is slid in a downward direction along the front surface 250 of the tray base assembly 214 until the top surface 260 of the tray member 216 substantially abuts the front surface 250 of the tray base assembly 214.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A tray apparatus comprising:
a tray base assembly attachable to a post attachment assembly, including a stop member positioned on a front surface thereof and a tray articulation coupling member extending substantially horizontally across the tray base assembly above the stop member;
a tray member having a top surface and a bottom surface, an inner edge and an outer edge, a first side edge and a second side edge opposing the first side edge, to, in turn, define a width, the first side edge including a first opening and the second side edge including a second opening, the width of the tray member being substantially wider than the longitudinal length of the tray articulation coupling member; and
a tray articulating member comprising a bracket having a central region rotatably coupled to the tray articulation coupling member of the tray base assembly, a first side region rotatably coupled to the first side edge and a second side region rotatably coupled to the second side edge, the first side region extending obliquely in an outward and downward direction from the central region and terminating with an inwardly directed hook region with a first tray engagement end and the second side region extending obliquely in an outward and downward direction from the central region and terminating with an inwardly directed hook region with a second tray engagement end, with the first tray engagement end extending into the first opening, and the second tray engagement end extending into the second opening;
wherein the tray member is movable between a collapsed configuration wherein the top surface of the tray member substantially abuts the front surface of the tray base assembly, and an articulated configuration wherein the top surface of the tray member substantially abuts the stop member of the tray base assembly, to, in turn, facilitate the use of the top surface thereof.

2. The tray apparatus of claim 1 further comprising a post attachment assembly comprising a clamp housing and an adjustment member, the clamp housing further comprises a front wall, and opposing side walls, cooperatively defining a clamp slot, one of the opposing side walls including an opening extending therethrough having a threadform, the adjustment member comprising a screw member having a threadform matingly engageable with the threadform of the opening.

3. The apparatus of claim 2 wherein the opposing side wall which does not include an opening includes a first oblique panel and a second oblique panel, wherein the panels are oblique to each other, to the front wall and to the opposing side wall having the opening therethrough.

4. The tray apparatus of claim 1 wherein the tray base assembly further comprises an elongated member extending below the stop member, the elongated member including a tray bearing region upon which an inner edge of the tray member is slidably guidable between a collapsed and an articulated configuration.

5. The tray apparatus of claim 1 wherein the tray articulation coupling member comprises a longitudinal slot having a dampening sleeve positioned therein between the bracket and the longitudinal slot, the dampening sleeve being biased against the longitudinal slot and the bracket.

6. The tray apparatus of claim 1 wherein the outer edge of the tray member comprises a convex configuration.

7. The tray apparatus of claim 6 wherein the tray member is substantially symmetrical about a longitudinal axis perpendicular to and extending about a midpoint of the base contact surface.

8. The tray apparatus of claim 1 wherein the top surface of the tray member further includes a channel embedded therein.

9. The tray apparatus of claim 8 wherein the top surface includes an outer embedded channel which follows a portion of an outer edge and the side edges thereof, and, an inner embedded channel which follows a portion of an inner edge thereof.

10. The tray apparatus of claim 1 wherein the tray base assembly comprises a stamped elongated member, wherein the tray articulation coupling member comprises a slot that is outwardly stamped from the stamped elongated member, with the central region of the bracket of the tray articulating member being pivotably positioned within the slot.

* * * * *